United States Patent [19]

Buannec

[11] Patent Number: 4,478,107
[45] Date of Patent: Oct. 23, 1984

[54] SUCTION CAP FOR AN AUTOMATIC GEARBOX

[75] Inventor: Michel Buannec, Villejuif, France

[73] Assignee: Regie Nationale des Usines Renault

[21] Appl. No.: 310,831

[22] Filed: Oct. 13, 1981

Related U.S. Application Data

[63] Continuation of Ser. No. 79,922, Sep. 28, 1979, abandoned.

[30] Foreign Application Priority Data

Oct. 12, 1978 [FR] France .................. 78 29190

[51] Int. Cl.³ .................. B60K 23/00; F01B 9/02
[52] U.S. Cl. .................. 74/863; 92/13.2; 92/13.41; 92/94; 92/168; 92/99; 92/128
[58] Field of Search ............ 92/98 D, 94, 13.2, 13.41, 92/98 R, 130 C, 168, 99, 100, 167, 128

[56] References Cited

U.S. PATENT DOCUMENTS

| | | | |
|---|---|---|---|
| 2,028,371 | 1/1936 | Wiltse | 92/100 |
| 2,106,592 | 1/1938 | Dick | 92/130 C |
| 2,134,072 | 10/1938 | Christensen | 92/99 |
| 2,762,615 | 9/1956 | Cedarholm | 92/94 |
| 2,897,836 | 8/1959 | Peters | 92/94 |
| 2,938,403 | 5/1960 | Harrison | 74/472 |
| 3,025,877 | 3/1962 | Buckay | 92/94 |
| 3,081,793 | 3/1963 | Flatt | 92/100 |
| 3,155,012 | 11/1964 | Ayers, Jr. | 92/94 |
| 3,888,143 | 6/1975 | Kolehmainen | 74/844 |
| 4,056,043 | 11/1977 | Srivamamurty | 92/13.41 |

FOREIGN PATENT DOCUMENTS

2710460  9/1977  Fed. Rep. of Germany ..... 92/98 D

*Primary Examiner*—Abraham Hershkovitz
*Attorney, Agent, or Firm*—Owen, Wickersham & Erickson

[57] ABSTRACT

A suction cap for the control of the oil pressure regulation system in an automatic gearbox comprising an intermediate chamber bounded by a diaphragm, a housing and a bellows, with a spring connected, on the one hand, to a push-rod and engaging, on the other hand, an inner radial surface of the housing.

9 Claims, 3 Drawing Figures

SUCTION CAP FOR AN AUTOMATIC GEARBOX

This is a continuation, of application Ser. No. 79,922 filed Sept. 28, 1979, now abandoned.

BACKGROUND OF THE INVENTION

This invention relates to a suction cap for the control of oil pressure regulation in an automatic gearbox, depending upon the suction or lowering in pressure created by the intake manifold of a motor, which suction is representative of the motor torque.

Embodiments of suction caps for the control of the pressure regulation in an automatic gearbox in relation to the motor suction are already known.

Some suction caps are equipped with a diaphragm. This diaphragm, on which the motor suction acts, works against a spring and makes it possible to change the position of the spool of the pressure regulating valve in a gearbox through a push-rod. This diaphragm also ensures the tightness between the gearbox which contains oil and that part of the cap which is connected with the motor suction.

Such a cap has many disadvantages. In particular, there is only one sealing means between the motor suction and the gearbox so that if the only diaphragm has a leak, the gearbox oil is rapidly sucked out by the motor because of the suction. Then the gearbox is most likely to be damaged owing to a lack of oil, and poor operation of the motor is possible because of gearbox oil getting into the fuel mixture.

A suction cap is also known which is equipped with a metallic bellows and a sealing bellows. This metallic bellows substantially performs the same function as the diaphragm in the above-mentioned example. The seal between the gearbox and the cap is obtained in this case by the sealing bellows.

This cap with a metallic bellows has the disadvantage of being bulky and expensive because the adjustment means of this cap is self-contained and distinct from the device which fastens it to the gearbox casing. This adjustment is indeed realized by a screw-nut device with a lock-nut and it is made by shifting the bearing cup of the cap spring in relation to the position of the push-rod given by the position of the required adjustment.

An object of this invention is to overcome the above-mentioned disadvantages.

SUMMARY OF THE INVENTION

The suction cap for the control of the pressure regulation system in an automatic gearbox, according to the invention, comprises a housing linked to the casing of the gearbox, a push-rod on which a spring acts in one direction while in the other direction the suction created by the intake manifold of a motor acts via a diaphragm and a sealing bellows. This unit also comprises a suction chamber connected with the manifold and an intermediate chamber communicating with atmosphere.

According to this invention, the spring lies in the intermediate chamber which is limited by the housing, the bellows fastened, on the one hand, to the housing and, on the other hand, to one end of the push-rod, and the diaphragm, which is fastened, on the one hand, to the other end of the push-rod and, on the other hand, to the housing. This spring which rests on an inner radial surface of the housing located between the diaphragm and the bellows and which is linked to the push-rod between this inner surface and the bellows, acts on the push-rod in the direction going from the diaphragm towards the bellows, so that it surrounds the push-rod.

The creation of an intermediate chamber between the sealing bellows and the diaphragm, which communicates with the air and in which lies the cap's spring, makes it possible to protect the gearbox as well as the motor. Indeed, if the sealing bellows is no longer leak-tight, the gearbox oil escapes from the intermediate chamber and the leak is visible, so that the user is warned before the gearbox is likely to be damaged because of a lack of oil. On the other hand, if the diaphragm is no longer leak-tight, the motor suction creates an additional air suction at the intermediate chamber level so that the motor is not properly fed and the user realizes this before the motor can be damaged.

According to this invention the housing of the suction cap comprises an outside thread which plays a double role. On the one hand, it fastens the cap to the gearbox casing and, on the other hand, it adjusts this cap by moving the cap in relation to the gearbox casing in order to obtain the required adjustment position.

According to this invention, the housing is preferably made of plastic so that its shape and particularly its thread can be obtained directly by molding.

Other features and advantages of this invention will become apparent from the following description of particular embodiments given as examples and not restricted thereto.

DESCRIPTION OF THE PREFERRED EMBODIMENTS

Figure 1:
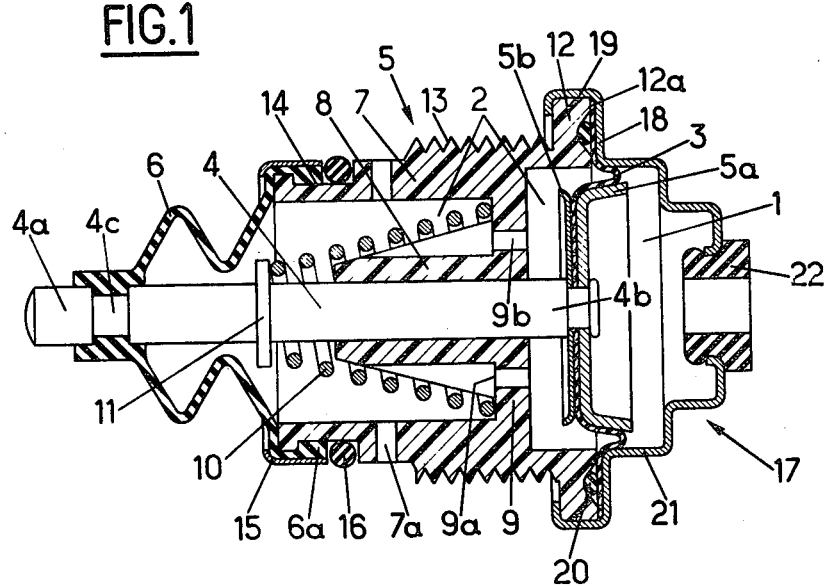
FIG. 1 is a view in cross-section of a suction cap embodying the principles of this invention, in which the diaphragm is maintained on the housing by means of a crimped cover.

In FIG. 1, the unit comprises a push-rod 4, a frontead 4a of which can act on the adjusting spool of a gearbox, not shown in this figure. The center part of a diaphragm 3 is gripped between two cups 5a and 5b, and this assembly is fastened, as by pressing, to an end 4b of the push-rod 4 at the opposite end from the end 4a.

An intermediate chamber 2 is defined by the diaphragm 3, a housing 5, and bellows 6.

The housing 5 comprises a substantially cylindrical outer part 7 and a substantially cylindrical inner part 8 coaxial with the outer part 7 and traversed by the push-rod 4. These two parts 7 and 8 of the housing 5 are linked by a radial ring-shaped spacer 9 forming a radial inner surface 9a on the side of the end 4a of the push-rod 4 on which rests a conical spring 10, the other end of which abuts on a shoulder 11 of the push-rod 4. The spacer 9 comprises axial passages 9b, since this spacer 9 divides the intermediate chamber 2 into two parts.

The outer part 7 of the housing 5 comprises a shoulder 12, a threaded part 13 and a groove 14 between the diaphragm 3 and the bellows 6.

The bellows 6 is mounted on the one hand in a groove 4c close to the end 4a of the push-rod 4, and is maintained on the other hand in the housing groove 14 by means of a clamping ring 15 which surrounds and presses the outer edge 6a of the bellows 6.

An "O" ring 16 is also placed in the groove 14 between the end 6a of the bellows 6 and the threaded part 13. This ring 16 is intended to create a sealed connection between the housing 5 and the gearbox casing not shown in FIG. 1.

The threaded part 13 of the outer part 7 of the housing 5 is provided for mounting the cap in the gearbox casing and for adjusting the cap by screwing it in, as far as required.

The outer part 7 of the housing 5 also comprises radial holes 7a between the threaded part 13 and the groove 14; the threaded part 13 comprises an outer axial groove, not shown, and this groove and the holes 7a enabling the intermediate chamber 2 to communicate with atmosphere.

The suction chamber 1 is limited, on the one hand, by the diaphragm 3 and, on the other hand, by a cover 17.

This cover 17, which may be made of sheet metal, as in the example shown in FIG. 1, has a radial ring-shaped wall 18 which holds the outer edge of the diaphragm 3 against a radial face 12a of the shoulder 12 by means of an extension 19 of the wall 18, which is crimped on the shoulder 12. An "O" ring 20 is placed in a ring-shaped groove in the face 12a of the shoulder 12 and creates a tight seal between the diaphragm 3 and the housing 5.

The cover 17 also comprises a part 21 preferably of octagonal cross-section extending the wall 18 at right angles and used, with an appropriate wrench, for mounting and adjusting the cap. This part 21 is also used to maintain the adjustment by means of a locking clamp not shown in FIG. 1.

The cover 17 also comprises a center port for passing a pipe which is connected with the motor suction and mounted in this center port by means of a sealing bush 22.

Figure 2:
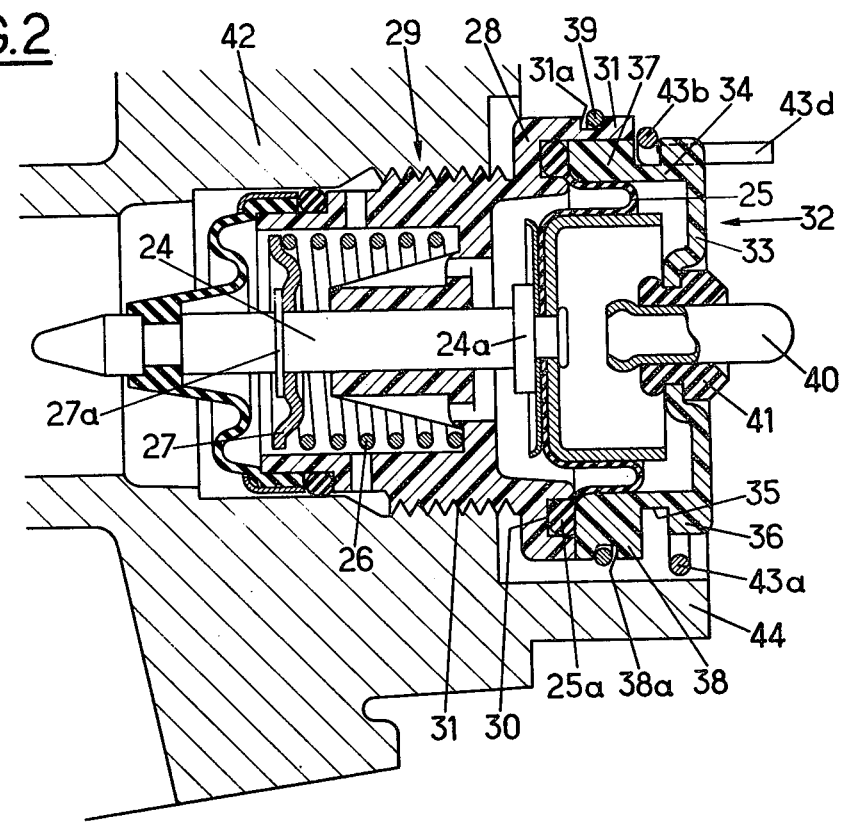
FIG. 2 is a view in cross-section of a suction cap embodying the principles of this invention in which the diaphragm is maintained on the housing by means of a slotted cover.
Figure 3:
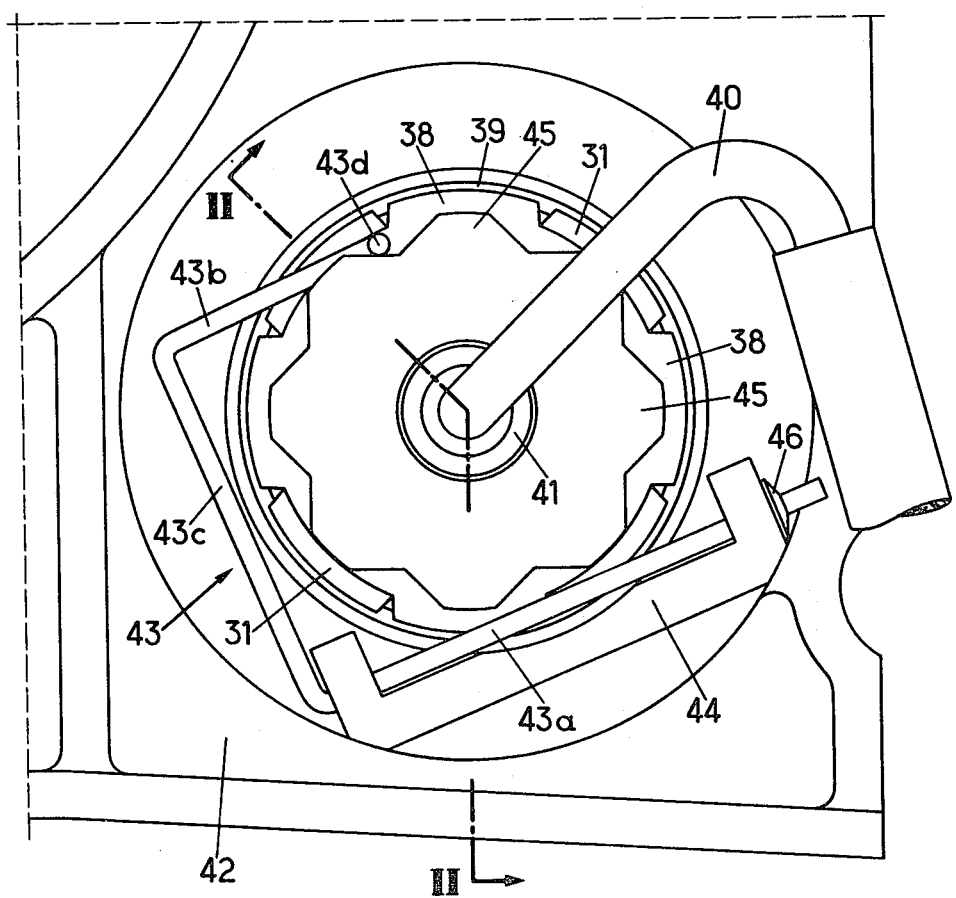
FIG. 3 shows the cap of FIG. 2 seen from the cover side.

The example of a suction cap shown in FIGS. 2 and 3 is close to that shown in FIG. 1. However, it differs from the latter in the connection between the spring and the push-rod and in the cover design.

Indeed, because its push-rod 24 has a shoulder 24a at its end, on which its diaphragm 25 is set, a cylindrical spring 26 acts on a washer 27 which itself acts on a lock washer or circlip 27a mounted in a groove of the push-rod 24.

In the example shown in FIGS. 2 and 3, a shoulder 28 of a housing 29, which corresponds to the shoulder 12 of the housing 5 shown in FIG. 1, comprises an axial ring-shaped groove 30 opposed to a threaded part 31 of the housing 29 and which receives the peripheral flange 25a of the diaphragm 25. The peripheral part of the shoulder 28 adjacent to the groove 30 extends in regularly spaced axial claws 31.

The cap shown in FIGS. 2 and 3 comprises a cover 32 which comprises a radial part 33 and a substantially cylindrical part 34. The cylindrical part 34 comprises a peripheral outer groove 35 which forms a shoulder 36 adjacent to the radial part 33 and a shoulder 37. The shoulder 37 is equipped circumferentially with axially extending corrugations 38 regularly spaced on its periphery. The shoulder 34 is dimensioned so that its smaller-radius portions fit into the inner cylinder formed by the claws 31.

The claws 31 and the corrugations 38 have corresponding circumferential grooves 31a and 38a which can receive a retaining ring 39 in order to lock the cover 32 and the housing 29 together.

When the cover 32 is mounted on the housing 29, each corrugation projection 38 substantially fills the space between two adjacent claws 31, and the end of the cylindrical part 34 of the cover 32 keeps the flange 25a of the diaphragm 25 pressed in the groove 30 of the housing 29 by means of the retaining ring 39, in order to create a tight seal between the housing 29 and the diaphragm 25 and between the cover 32 and the diaphragm 25.

The wall 33 of the cover 32 has a port through which passes a pipe 40 connected with a motor intake manifold, the pipe 40 being secured to the wall 32 through a sealing grommet 41.

FIGS. 2 and 3 show means for keeping the cap adjustment in a set position, the adjustment being obtained by screwing the unit more or less deeply into a gearbox casing 42.

This means comprises a resilient pin 43 which has two substantially parallel legs 43a, 43b linked together by a leg 43c. This pin also comprises a leg 43d which extends the leg 43b and is perpendicular to the general plane of this pin.

The leg 43a is pivotally mounted on an extension 44 of the frame 42 in order to be perpendicular to the general center line of the cap. In the position shown, the leg 43b of the pin 43 penetrates into the groove 35 of the cover 32 and lies opposite the leg 43a on the other side of the cap's center line. The leg 43d, which projects well beyond the radial wall 33 of the cover 32, engages, owing to its resilience, with a cog 45 of the shoulder 36 which is equipped with regularly spaced cogs round its periphery in order to prevent the cover 32 and thus the housing 29 from rotating in relation to the casing 42.

If it is desired to change the adjustment of the cap, it is sufficient to disengage the leg 43d from one cog 45 and then to rotate the cap in either direction. Thus, the leg 43d of the pin 43 will engage with another cog 45 of the cover 32 in order to maintain the cap in the new chosen position.

The leg 43a of the pin 43 can be equipped with a washer 46 at its free end in order to prevent any axial shift of this leg.

The housing of the cap according to this invention is preferably made of plastic material and thus can be molded directly without any further machining. The cover of the cap as described in the example shown in FIGS. 2 and 3 is also advantageously made of plastic material.

It can be seen from the two above-described examples that the cap according to this invention avoids pumping of the gearbox oil as soon as one of the elements, and particularly the diaphragm, proves to be defective. In addition, the cap according to this invention is compact and has a unified mode of adjustment and locking which enables the unit to be used in all models of automatic gearbox.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What I claim is:

1. A suction cap for the control of pressure regulation in an automatic gearbox for an engine having an intake manifold where suction is developed, comprising:

a housing having means for adjustable connection to and sealing against the casing of said gearbox, said housing comprising a substantially cylindrical outer part and a cover member on one end of the cylindrical outer part of said housing, a diaphragm having a peripheral part retained by said cover member on said housing and defining with said cover member a suction chamber connectable to the intake manifold by means mounted on said cover, an intermediate chamber in said housing separated from said suction chamber by said diaphragm and communicating with atmosphere, a push-rod having one end secured to said diaphragm and extending into said intermediate chamber substantially axially to the cylindrical outer part of said housing, a sealing bellows retained at one end by the other end of the cylindrical outer part of said housing and at its other end by the other end of said push-rod for defining said intermediate chamber with the cylindrical outer part of said housing and said diaphragm, a spring in said intermediate chamber, having one end resting on a radially inwardly extending portion of said chamber and the other end resting on connecting means provided on said push-rod, said spring acting on the push-rod in a direction opposite to that of the suction of the suction chamber, said housing having in said intermediate chamber, for the axial guiding of the push-rod, a substantially cylindrical inner part coaxial with said cylindrical outer part and tranversed by the push-rod, said inner part of the housing being situated between the connection of the push-rod with the diaphragm and the connection of the push-rod with the spring and connected to said cylindrical outer part by said radially inwardly extending portion engaged by the spring and provided with axial air passage means therethrough, and said housing having a threaded portion on the outer surface of said outer part for mounting the cap on the gearbox with the bellow disposed in the gearbox and for adjusting the position of the cap with respect to the gearbox axially to the push-rod by rotation of the cap and means for maintaining the housing in any required adjustment position.

2. A suction cap according to claim 1, wherein the housing comprises a radial ring-shaped spacer linking said outer part to said inner part and forming said radially inwardly extending portion which is engaged by said spring, said spacer having said axial air passage means therethrough.

3. A suction cap according to claim 1, wherein the outer part of the housing is provided with a groove for mounting said bellows and for inserting an "O" ring in order to create a tight seal between the gearbox casing and the housing, and a clamping ring securing the edge of the bellows to the housing surrounding the bellows edge and pressing it to said housing.

4. A suction cap according to claim 1, wherein the outer part of the housing is provided with radial passageways connecting said intermediate chamber to atmosphere.

5. A suction cap according to claim 1, wherein said cover has a port and a pipe mounted in the port by means of a sealing bush, for connection with said intake manifold suction.

6. A suction cap according to claim 1, wherein said cover has a peripheral portion for maintaining a peripheral part of said diaphragm, pressed and crimped on a shoulder of the outer part of the housing, said cover comprising a part of octagonal cross-section.

7. A suction cap for the control of pressure regulation in an automatic gearbox for an engine having an intake manifold where suction is developed, comprising:

a housing with a cover member, said housing being generally cylindrical and having a radially inwardly extending portion and having an intermediate chamber, a diaphragm having a peripheral part retained by said cover member on said housing and defining with said cover member a suction chamber connectable to the intake manifold, a push-rod having one end secured to said diaphragm and extending into said intermediate chamber of said housing, which is separated from said suction chamber by said diaphragm and communicates with atmosphere, a spring in said intermediate chamber, resting on said radially inwardly extending portion of said housing and being operatively connected between the push-rod and said radially extending portion, said spring acting on the push-rod in a direction opposite to that of the suction in the suction chamber, a sealing bellows retained at one end by said housing and at the other end by said push-rod for defining said intermediate chamber along with said housing and said diaphragm, the outer surface of said housing being threaded for mounting the cap in the gearbox and for adjusting the cap by rotation, means for maintaining the housing in any required adjustment position, an outer part of the housing extending axially in regularly spaced claws forming an inner cylinder, said cover comprising a cylindrical part which penetrates into said inner cylinder and has axial outer corrugations with regularly spaced portions located between the said claws, a retaining ring housed in a mating outer circumferential groove provided in the said claws and said corrugations and securing said cover to said housing, the peripheral part of said diaphragm being kept pressed on the housing by means of the said cylindrical part of the cover.

8. A suction cap for the control of pressure regulation in an automatic gearbox for an engine having an intake manifold where suction is developed, comprising:

a housing with a cover member, said housing being generally cylindrical and having a radially inwardly extending portion and having an intermediate chamber, a diaphragm having a peripheral part retained by said cover member on said housing and defining with said cover member a suction chamber connectable to the intake manifold, a push-rod having one end secured to said diaphragm and extending into said intermediate chamber of said housing, which is separated from said suction chamber by said diaphragm and communicates with atmosphere, a spring in said intermediate chamber, resting on said radially inwardly extending portion of said housing and being operatively connected between the push-rod and said radially extending portion, said spring acting on the push-rod in a direction opposite to that of the suction in the suction chamber, a sealing bellows retained at one end by said housing and at the other end by said push-rod for defining said intermediate chamber along with said housing and said diaphragm, an outer part of the housing extending axially in regularly spaced claws forming an inner cylinder, and having an outer surface of said housing threaded for mounting the cap in the gearbox and for adjusting the cap, said cover having cogs thereon, and comprising a cylindrical part which penetrates into said inner cylinder and has axial outer corrugations with regularly spaced portions located between the said claws, a pin, linked on the on hand with the gearbox casing and engaging, on the other hand, with said cogs, maintaining the housing in any required adjustment position, and a retaining ring housed in a mating outer circumferential groove provided in the said claws and said corrugations and securing said cover to said housing, the peripheral part of said diaphragm being kept pressed on the housing by means of the said cylindrical part of the cover.

9. An assembly for the control of pressure regulation in an automotive engine, comprising:

an intake manifold where suction is developed, an automatic gearbox having a casing, a generally cylindrical housing with a cylindrical cover member having axial outer corrugations with regularly spaced portions, said housing being adjustably connected to and sealed to the casing of said gearbox by means of a threaded outer surface, said housing having an intermediate chamber and an outer portion extending axially in regularly spaced claws forming an inner cylinder, said regularly spaced portion being located between said claws, a retaining ring housed in a mating outer circumferential groove provided in said claws and said corrugations and securing said cover to said housing, a diaphragm having a peripheral part retained by said cover member and closing one end of a suction chamber defined by said housing and said diaphragm, said suction chamber being connected to the intake manifold and the suction therein, a sealing bellows retained at one end by said housing, said bellows and housing defining an intermediate chamber communicating with atmosphere, said housing having a radially inwardly extending portion located between the diaphragm and the bellows, a push-rod secured to said diaphragm at an inner end and to said sealing bellows at a distal end extending into said intermediate chamber and separated from said suction chamber by said diaphragm, and a spring in said intermediate chamber and resting on said radially inwardly extending portion and being operatively connected to the push-rod between the said radially extending portion and the bellows, said spring acting on the push-rod in a direction opposite to that of the suction in the suction chamber, and means for adjustably connecting to and sealing against the casing of said gearbox, whereby said cap is mounted with the bellows disposed in the gearbox.

* * * * *